April 7, 1925.
A. T. STURT
1,532,557
REAR AXLE
Filed Sept. 15, 1922   2 Sheets-Sheet 1
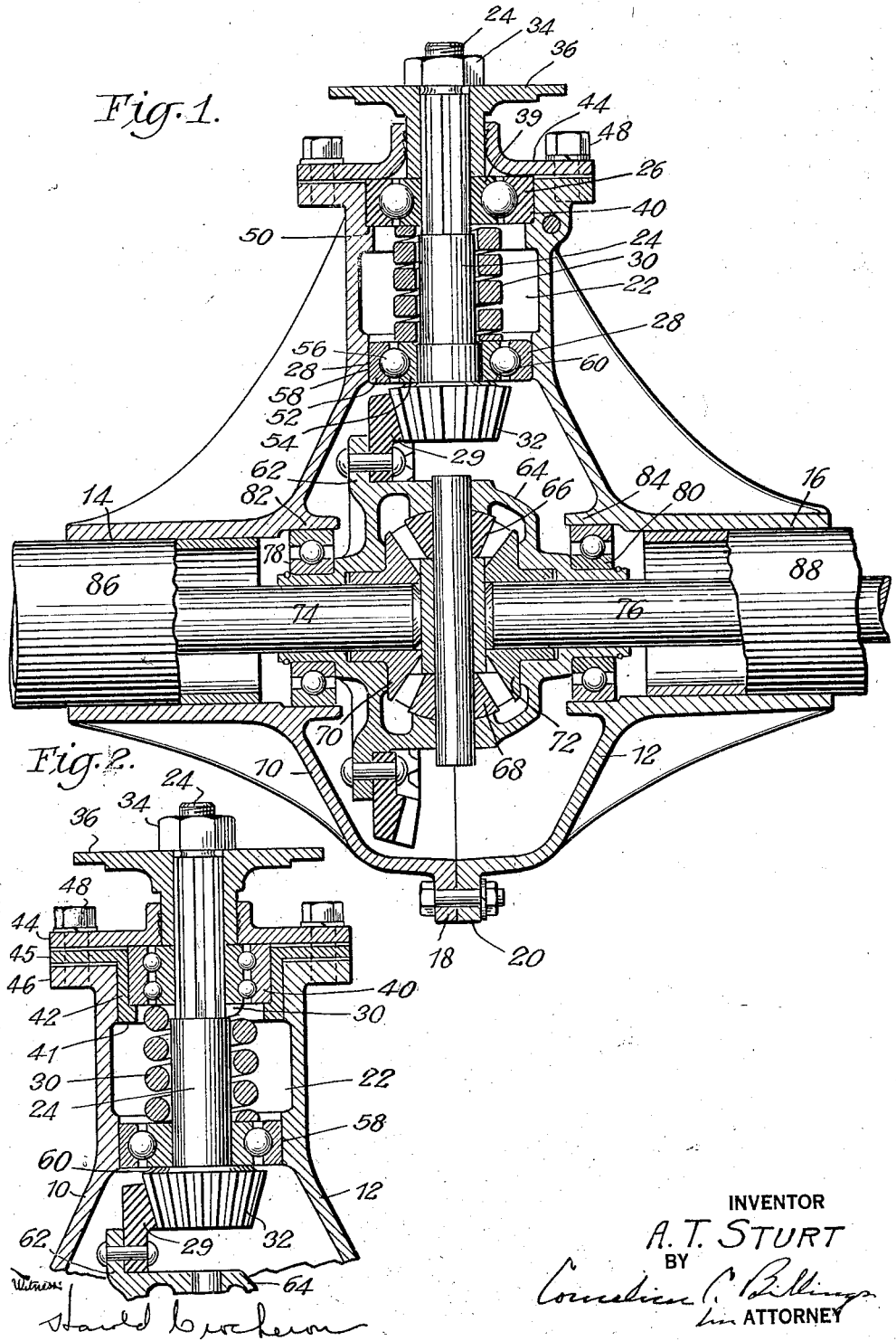
INVENTOR
A. T. STURT
BY
ATTORNEY

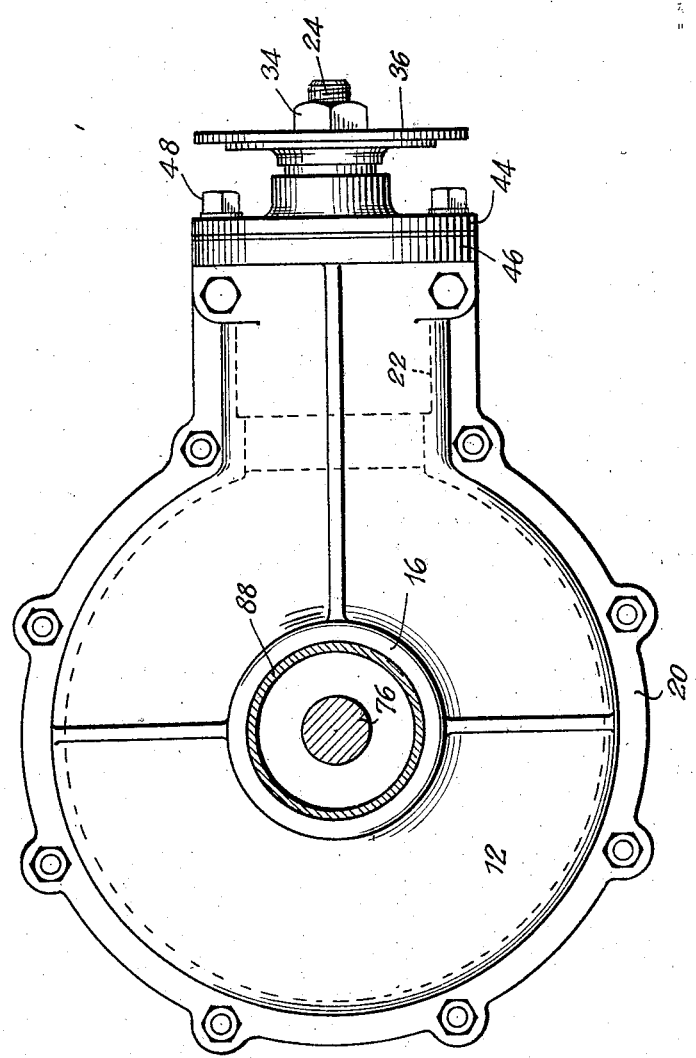

Patented Apr. 7, 1925.

1,532,557

UNITED STATES PATENT OFFICE.

ALFRED T. STURT, OF FLINT, MICHIGAN, ASSIGNOR TO WILLIAM C. DURANT, OF NEW YORK, N. Y.

REAR AXLE.

Application filed September 15, 1922. Serial No. 588,336.

*To all whom it may concern:*

Be it known that I, ALFRED T. STURT, a citizen of the United States, and a resident of Flint, county of Genesee, State of Michigan, have invented certain new and useful Improvements in Rear Axles, of which the following is a specification.

This invention relates to rear axles for automobiles and similar vehicles and, more particularly, to an improved housing for the bevel gear and transmission shaft pinion of the axle, and to an improved means for adjusting the longitudinal position of the driving pinion of the transmission shaft to the bevel gear of the rear axle.

In rear axle constructions heretofore used, the position of the driving pinion relative to the axle bevel gear was obtained by means of shims which positioned the pinion longitudinally of the transmission shaft and thus tightened or adjusted the pinion against the bevel gear. This necessitated a housing built in three or more parts, one of which, commonly termed a "third member" was required for supporting the transmission shaft bearing and for permitting the shimming adjustments. This method of adjustment involved considerable labor and a large number of parts, the proper ajustment of which was a frequent source of error. The necessity of the third member also added materially to the cost of construction and required an additional and expensive machining of the parts.

An object of the present invention is to provide a rear axle construction in which the adjustment of the driving pinion to the driven bevel gear may be readily and easily made without the use of shims.

Another object of the invention is to provide a rear axle housing construction in which the end of the transmission shaft and the driving pinion for the axle may be mounted in the housing without the necessity of a third housing member or separate shaft mounting.

A further object of the invention is to provide a rear axle construction in which an accurate adjustment of the driving pinion of the transmission shaft to the driven bevel gear of the axle may be readily made from the exterior of the gear housing.

A still further object of the invention is to provide a two piece gear housing for rear axle gearing capable of accurately mounting the parts of the rear axle and of the transmission shaft pinion.

Further objects of the invention are to simplify the construction through the reduction of the number of parts and joints in the housing and in providing members which may be easily machined.

With these and other objects in view, the invention comprises the device described and set forth in the following specification and claims.

The various features of the invention are illustrated in the accompanying drawings in which:

Fig. 1 is a section taken on the plane of the axis of the axle and transmission shaft through a rear axle housing and gearing embodying one form of the invention.

Fig. 2 is a similar section of a portion of a modified construction of pinion mounting.

Fig. 3 is a side view of one of the housing members.

In the present invention, the housing for the rear axle gears is formed of two parts each of which has a bearing support for the axle shaft positioned to lie in alignment with the other support when the parts are joined together. The housing parts also form a support for the transmission shaft bearings at right angles to the axle shaft. The bearings of the transmission shaft are so arranged that the shaft may be given a slight longitudinal adjustment sufficient to tighten the driving pinion carried on the shaft against the driven bevel gear of the axle shaft in assembling the gears or to take up wear, thereby avoiding the necessity of using shims for this adjustment. This longitudinal adjustment is preferably attained by providing the transmission shaft with two bearings, one of which is fixed rigidly to the casing and in which the shaft is slidably mounted, and the other of which is slidably mounted in the housing and fixed to the shaft. The latter bearing is pressed against the driving pinion by a spring confined between the bearings, which forces the movable bearing and pinion towards the bevel gear with a force greater than the axial thrust on the pinion. The position to which the pinion is forced in this manner is limited or determined by means of a nut threaded on the transmission shaft and bearing against a collar member which rotates with the shaft and rests against the rotating part of the fixed bearing, the adjustment of this nut thereby serving to adjust the tightness of the pinion against the bevel gear.

Referring more particularly to the accompanying drawings, the axle housing is formed of two substantially complementary parts 10 and 12 having hollow portions adapted to receive the gears of the axle and having openings 14 and 16 positioned to lie in alignment when the parts are joined and to form supports for the bearings of the axle shafts. The parts are provided at their edges with outwardly extending flanges 18 and 20 having flat adjacent faces on which the parts are joined. When the parts are thus joined they form a third opening 22 in which the bearings for the transmission shaft are supported.

A transmission shaft 24 is mounted in the opening 22 by means of a stationary bearing 26 rigidly fixed in position against longitudinal movement in the opening 22 and in which the shaft is longitudinally slidable, and a movable bearing 28 fixed to the shaft and mounted to move longitudinally in the opening 22 sufficiently to permit a slight longitudinal adjustment of the shaft. A spring 30 is mounted on the transmission shaft 24 and is confined between rotating members of the bearings 26 and 28 thereby pressing the bearing 28 away from the stationary bearing 26 toward a bevel gear 29 of the differential gears.

The shaft 24 carries a pinion 32 fitting tightly against the moving part of the bearing 28 and pressed by the bearing 28 and the spring 30. The extent to which the shaft and pinion are forced by the spring 30 is controlled by means of a nut 34 threaded on the shaft 24 and bearing against a collar 36 which is splined on and rotates with the shaft and bears against a rotating part 39 of the bearing 26. It will be apparent that as the nut 34 is threaded backward or forward on the shaft 24, the shaft and pinion 32 are moved away from or permitted to be forced toward the bevel gear 29 by the spring 30 and to be thus loosened or tightened against the bevel gear.

The bearing 26 may be of any suitable type.

In the form illustrated in Fig. 1, the outer track ring 40 of the bearing is held between an inwardly extending flange 50 on the inner wall of the opening 22 and the cover 44. As indicated in the drawings, the form of the bearing members and of the balls used may vary.

In the form shown in Fig. 2 of the drawings, a stationary outer track 40 of the bearing is held rigidly between an inwardly extending radial flange 41 of a flanged insert 42 and an annular cover 44 which fits over an outwardly projecting flange 45 of the insert and is fastened to a projecting flange 46 on the opening of the housing by means of bolts 48 or other suitable means.

The annular cover 44 also has an upturned annular flange at its inner edge surrounding the rotating flanged collar 36.

The spring 30 may be made of either a square or a round wire as indicated in Figs. 1 and 2, the square spring having the obvious advantage of permitting a stiffer spring for a given space. The spring should exert a greater thrust than that of the longitudinal thrust on the pinion 32 in order that it may always force the pinion to the limit fixed by the nut 34 regardless of the load.

The movable bearing 28 is also formed of an outer track 52 and an inner bearing ring 54 forming between them a raceway for the bearing balls 56. The outer track 52 is not, however, rigidly fixed to the housing opening 22 but is free to slide longitudinally in a short longitudinal trackway 58 formed on the inner wall of the opening portion 22. The inner ring 54 is forced by the spring 30 against a side face 60 of the pinion 32 and is rigidly attached to the shaft 24.

The bevel gear 29, driven by the pinion 32, is fastened to a flange 62 of a differential frame 64 which may be of the usual type having gears 66 and 68 rotating about the axis of the axle and meshing with bevel gears 70 and 72 fixed on axle shafts 74 and 76 in the usual manner. The axle shafts 74 and 76 are supported in suitable bearings 78 and 80 mounted in supporting surfaces 82 and 84 on the inner surface of the housing members surrounding the openings 14 and 16, the shafts extending through the openings 14 and 16. Suitable shaft tubes 86 and 88 may be mounted in the openings 14 and 16 to surround the shafts.

In assembling the mechanism the shafts and differential gearing are mounted in the housing members in the usual manner. The shaft 24 together with the bearings 26 and 28 and the spring 30 confined therebetween, the pinion 32, the flanged collar 36 and nut 34 are assembled in a unit and mounted in the opening 22 at the time of assembly. After all of the parts are mounted in the housing and the two halves of the housing are bolted together the nut 34 is tightened or loosened on the shaft 24 until the pinion 32 is adjusted to the proper position relatively to the bevel gear 29.

Through the above invention the transmission shaft may be easily mounted in the differential or axle housing and thereafter easily adjusted avoiding the necessity of fitting the pinion to the bevel gear by shimming at the time of assembly or thereafter. A large amount of labor is thereby eliminated and the cost of assembling the structure is reduced. By permitting the use of a two piece housing, the cost of the housing is materially reduced and the manufacturing adjustments in manufacturing the axles may also be reduced. The two piece housing also provides a unitary, strong structure, eliminates a large amount of machining and lessens the chances of error in fitting the parts.

Having described the invention, what I claim and desire to secure by Letters Patent is:

1. A device of the kind described which comprises a rear axle shaft and a transmission shaft at right angles thereto, a housing for said rear axle shaft comprising two complementary parts having alined bearing supports for the rear axle shaft and a neck portion extending at right angles to the axle shaft adapted to support bearings for the transmission shaft, a bearing for the transmission shaft which comprises a bearing rigidly mounted in said housing, a pinion on said transmission shaft, a bearing slidably mounted in said housing and adapted to bear against said pinion, a spring between said bearings and means for drawing said pinion and slidable bearing against the pressure of said spring.

2. In a device of the kind described, a housing, a bevel gear in said housing, a pinion arranged to mesh with said bevel gear, a shaft for said pinion, a bearing for said shaft fixed in said housing, a bearing for said shaft fixed longitudinally on said shaft and slidable in said housing, a spring between said bearings to exert pressure thereon, and means for adjusting the distance of the fixed bearing from the slidable bearing.

3. In a device of the kind described, a housing, a bevel gear in said housing, a pinion adapted to mesh with said bevel gear, a shaft for said pinion, a fixed bearing for said shaft in which said shaft may slide longitudinally, a bearing fixed longitudinally on said shaft and slidable in said housing, a spring between said bearings to force said shaft and pinion towards said bevel gear, and means on said shaft to limit the position to which said shaft is forced by said spring.

4. In a device of the kind described, a housing a bevel gear in said housing, a pinion adapted to mesh with said gear, a shaft for said pinion, a fixed bearing for said shaft in which said shaft may slide longitudinally, a bearing fixed to said shaft and slidable longitudinally in said housing, a spring between said bearings to force said shaft and pinion towards said bevel gear, and a nut on said shaft bearing against said longitudinally fixed bearing and adapted to limit the longitudinal position of said shaft toward said bevel gear.

5. In a device of the kind described, a housing, a bevel gear in said housing, a pinion adapted to mesh with said gear, a shaft for said pinion, a fixed bearing in which said shaft is slidable longitudinally, spring means for forcing said shaft longitudinally towards said bevel gear, and means for limiting the movement of said shaft towards said bevel gear.

6. In a device of the kind described, a housing, a bevel gear in said housing, a pinion adapted to mesh with said gear, a shaft for said pinion, a bearing in which said shaft may move longitudinally, means for continually exerting a force on said shaft and pinion towards said bevel gear and means outside of said housing for limiting the distance to which said shaft and pinion are forced.

In witness whereof I have hereunto set my hand at Long Island City, county of Queens, State of New York, this 12th day of September, 1922.

ALFRED T. STURT.